US009792440B1

(12) United States Patent
Wang (10) Patent No.: US 9,792,440 B1
(45) Date of Patent: Oct. 17, 2017

(54) SECURE BOOT FOR VEHICULAR SYSTEMS

(71) Applicant: Symantec Corporation, Mountain View, CA (US)

(72) Inventor: Qiyan Wang, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 90 days.

(21) Appl. No.: 14/475,370

(22) Filed: Sep. 2, 2014

Related U.S. Application Data

(60) Provisional application No. 61/981,070, filed on Apr. 17, 2014.

(51) Int. Cl.
*G06F 21/57* (2013.01)
*G06F 21/44* (2013.01)

(52) U.S. Cl.
CPC ............ *G06F 21/575* (2013.01); *G06F 21/44* (2013.01)

(58) Field of Classification Search
CPC ........ G06F 21/57; G06F 21/575; G06F 21/44; G06F 21/572; G06F 21/05; H04L 63/12
USPC ........... 713/2, 187, 168, 176; 726/17, 19, 21
See application file for complete search history.

(56) References Cited

U.S. PATENT DOCUMENTS

| | | | | | |
|---|---|---|---|---|---|
| 5,966,300 | A | * | 10/1999 | Flood | G05B 9/03 700/2 |
| 9,231,936 | B1 | * | 1/2016 | Wang | H04L 63/08 |
| 9,280,653 | B2 | * | 3/2016 | Forest | G06F 21/44 |
| 2007/0118269 | A1 | * | 5/2007 | Gibson | F02D 41/266 701/84 |
| 2009/0222910 | A1 | * | 9/2009 | Le Bihan | G06F 21/445 726/19 |
| 2011/0041178 | A1 | * | 2/2011 | Jakobsson | G06F 21/566 726/22 |
| 2011/0138188 | A1 | * | 6/2011 | Lee | G06F 21/57 713/187 |
| 2013/0124840 | A1 | * | 5/2013 | Diluoffo | G06F 21/575 713/2 |
| 2014/0032916 | A1 | * | 1/2014 | Costin | H04L 9/3236 713/176 |
| 2014/0075579 | A1 | * | 3/2014 | Baltes | G06F 8/61 726/30 |

OTHER PUBLICATIONS

A framework for self-verification of firmware updates over the air in vehicle ECUs, Nilsson et al, pp. 1-5, IEEE, 2008.*
Hisashi Oguma et al, New Attestation-Based Security Architecture for In-vehicle Communication, IEEE, 2008.*
Vijaiya Prathap et al, Penetration Testing of Vehicle ECUs, Chalmers University of Technology, 2013.*

* cited by examiner

*Primary Examiner* — Shanto M Abedin
(74) *Attorney, Agent, or Firm* — Maschoff Brennan (57) ABSTRACT

A method for a secure boot of a vehicular system is provided. The method includes performing a security self-verification on a first electronic control unit (ECU) of a vehicular system and sending a security challenge to a second electronic control unit of the vehicular system. The method includes verifying a security response from the second electronic control unit, the security response relating to the security challenge and indicating an aspect of contents of memory of the second electronic control unit. The performing the security self-verification and verifying the security response establishes a chain of trust that includes the first electronic control unit and the second electronic control unit.

19 Claims, 4 Drawing Sheets

SECURE BOOT FOR VEHICULAR SYSTEMS

This application claims benefit of priority from U.S. Provisional Application No. 61/981,070 filed Apr. 17, 2014, which is hereby incorporated by reference.

BACKGROUND

Modern vehicles, such as cars, trucks, busses and other personal and commercial vehicles, have many Electronic Control Units (ECUs) installed therein, typically on the order of ten or more ECUs per vehicle. ECUs communicate with each other for sending and receiving control messages and system data over the internal Controller Area Network (CAN) bus. In addition, there is an OBD-II (onboard diagnostics, second generation) port connected to the CAN bus which allows a technician or other user to connect certain diagnostics devices to the internal CAN bus in order to perform functions such as retrieving information or reprogramming a specified ECU. Recently, researchers have discovered a number of cyber attacks which can compromise some ECUs (such as telematics ECUs) by leveraging the external interfaces to compromise an ECU, or reprogramming an ECU with a manipulated firmware through the OBD-II port. Potentially, an attacker could gain entrance through the OBD-II port, Bluetooth, cellular telephonic communication, a CD drive, voice control, or other port or peripheral connected to the CAN bus. Once an attacker gains control of a compromised ECU, the attacker can inject illegitimate CAN messages onto the CAN bus to control the vehicle.

The embodiments arise in this context.

SUMMARY

In some embodiments, a method for a secure boot of a vehicular system is provided. The method includes performing a security self-verification on a first electronic control unit (ECU) of a vehicular system and sending a security challenge to a second electronic control unit of the vehicular system. The method includes verifying a security response from the second electronic control unit, the security response relating to the security challenge and indicating an aspect of contents of memory of the second electronic control unit. The performing the security self-verification and verifying the security response establishes a chain of trust that includes the first electronic control unit and the second electronic control unit.

In some embodiments, a tangible, non-transitory, computer-readable media having instructions thereupon which, when executed by a processor, cause the processor to perform a method. The method includes performing a security self-check of a first electronic control unit of a vehicular system, wherein the processor is included in the first electronic control unit of the vehicular system. The method includes generating a security challenge and transmitting the security challenge to a second electronic control unit of the vehicular system, via a network or bus of the vehicular system. The method includes receiving a security response from the second electronic control unit, via the network or bus, wherein the security response is in reply to the security challenge and relates to memory contents of the second electronic control unit. The method includes verifying the security response, wherein verifying the security response validates at least a portion of the memory contents of the second electronic control unit.

In some embodiments, a vehicular system with secure boot is provided. The system includes a vehicular network or bus and a primary electronic control unit, coupled to the vehicular network or bus. The primary electronic control unit having a processor, a security module, a challenge generator and a response checker. The security module is configured to perform a self-check of the primary electronic control unit. The challenge generator is configured to generate a security challenge and to send the security challenge to a secondary electronic control unit of the vehicular system via the vehicular network or bus. The response checker is configured to receive a security response from the secondary electronic control unit and configured to check the security response as to validity of at least a portion of contents of memory of the secondary electronic control unit.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The embodiments provide a vehicular system with multiple electronic control units (ECUs) constructs a chain of trust for the electronic control units, in order to protect the vehicular system from cyber attacks. The system first verifies one of the electronic control units, generally the most powerful device, which is equipped with security hardware, firmware and/or software. Then, the system verifies each of the other electronic control units. This leverages the first verified device and extends the chain of trust. Protecting the vehicular system from cyber attacks by using a secure boot ensures that, upon the vehicle being started, each electronic control unit is verified. The vehicle system is booted from a clean and authenticated state, so that no implanted malware can survive over re-boot.

Determination of which electronic control unit to verify first should be made during system design, development or configuration. Generally, once the vehicular system is installed in a vehicle, the selection of which electronic control unit to verify first is not changed, although the electronic control units may be updatable or upgradable under certain circumstances. Electronic control units in a vehicle may have comparable computing power and resources, but generally differ in these aspects. Generally, the most powerful electronic control unit in the vehicular system (i.e., the one with the fastest processor and/or the processor with the most bit width and resources) should verify first. A good choice for the electronic control unit to verify first, in one embodiment, is the infotainment or telematics unit, although another electronic control unit could be specified in further embodiments.

Infotainment combines information and entertainment. Telematics combines telecommunications and various vehicular technologies, and may include a global positioning system (GPS) module, e.g., in navigation systems. Increasingly, telematics systems are making use of mobile data and wireless data communications. Some units combine infotainment and telematics. An infotainment system may have, for example, a CD player, a viewscreen, a universal serial bus (USB) port, Bluetooth connectivity (for cell phone use), cellular telephonic connectivity (which may include Internet connectivity), satellite connectivity (for satellite radio and/or satellite television) and so on. Some of these external user interfaces or ports are vulnerable to attack.

An infotainment or telematics unit typically has the greatest computational resources (such as CPU or central processing unit, and memory) among all of the electronic control units, and in some sense may be thought of as the "brain" of the vehicle. Some vehicle manufacturers (such as Ford) use ARM (Acorn RISC Machine, a reduced instruction set computing architecture) processors in infotainment units. Some of these ARM processors have a feature known as Trustzone security extension, which can be leveraged as a hardware-based root of trust to verify the computational stack, in present embodiments. Other electronic control units may have more limited processors and hardware-based root of trust may not be available on these. Generally the more powerful electronic control unit is the best candidate for the first-to-verify unit in present embodiments of a vehicular system. The remaining electronic control units are verified using the leverage of the first verified device.

Figure 1:
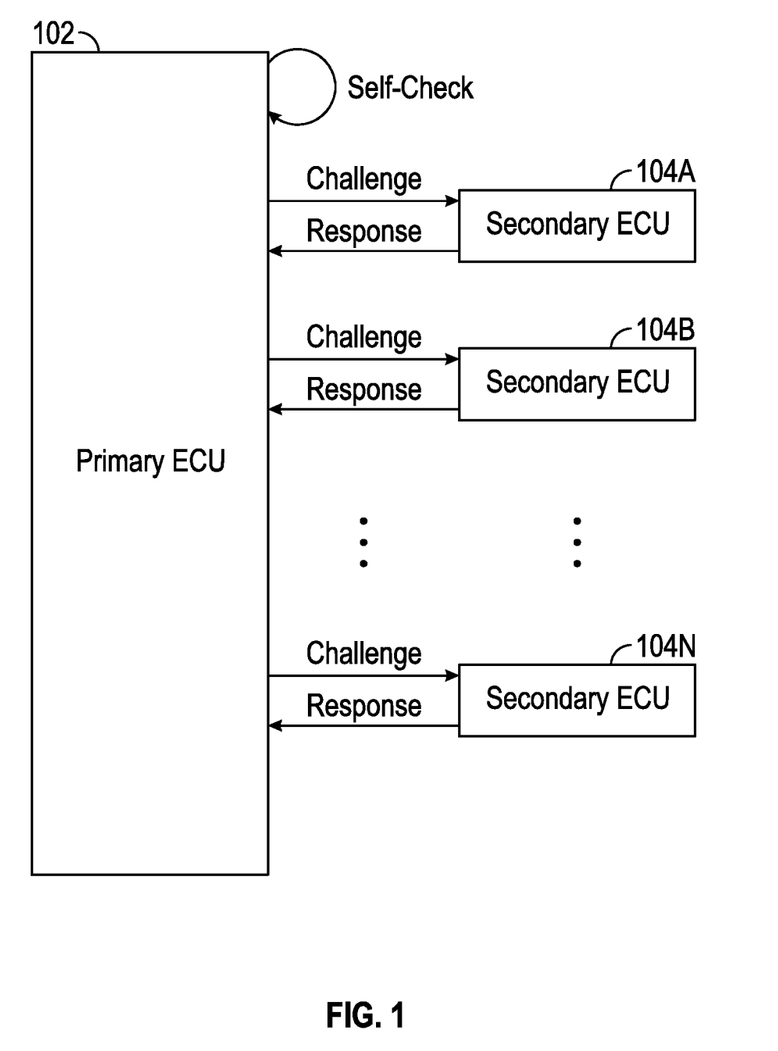
FIG. 1 is a system diagram depicting a primary electronic control unit performing a self-check, followed by challenges to and responses from multiple secondary electronic control units, in a vehicular system in accordance with some embodiments.

FIG. 1 is a system diagram depicting a primary electronic control unit 102 performing a self-check, followed by challenges to and responses from multiple secondary electronic control units 104A, 104B, 104N, in a vehicular system. The designation of one of the electronic control units as the primary electronic control unit 102, and the other electronic control units as secondary electronic control units 104A, 104B, . . . 104N is not arbitrary. The primary electronic control unit 102 is the first electronic unit to verify, and self-verifies by performing a self-check. This begins the chain of trust. The chain of trust is then extended to the secondary electronic control units 104A, 104B, . . . 104N. The secondary electronic control units 104A, 104B, 104N, do not necessarily self-verify by performing the same self-check as the primary electronic control unit 102, as they may lack this capability, but instead are verified by the primary electronic control unit 102. The primary electronic control unit 102 sends a challenge to each of the secondary electronic control units 104A, 104B, 104N. Each of the secondary electronic control units 104A, 104B, 104N, sends back a response to the challenge. Further details of challenges and responses, and verifications, are discussed below with reference to FIG. 2. By following this sequence, the chain of trust is established for the primary electronic control unit 102 and extended to each of the secondary electronic control units 104A, 104B, 104N, until all electronic control units are verified.

Some embodiments may have as few as two electronic control units (e.g., a primary electronic control unit 102 and a secondary electronic control unit 104A), but will typically have more than two electronic control units. If an attacker has installed malware in any of the electronic control units 102, 104A, 104B, . . . 104N, the malware is detected during the above sequence. The system can then indicate that an electronic control unit 102, 104A, 104B, . . . 104N is compromised, e.g., by posting a message on a display of an infotainment or telematics unit, illuminating a lamp on a dashboard display, sending a trouble code, and/or branching to a failsafe routine. A failsafe routine could isolate the compromised electronic control unit, or use a subset of operations or a differing set of operations (such as "limp home mode").

Figure 2:
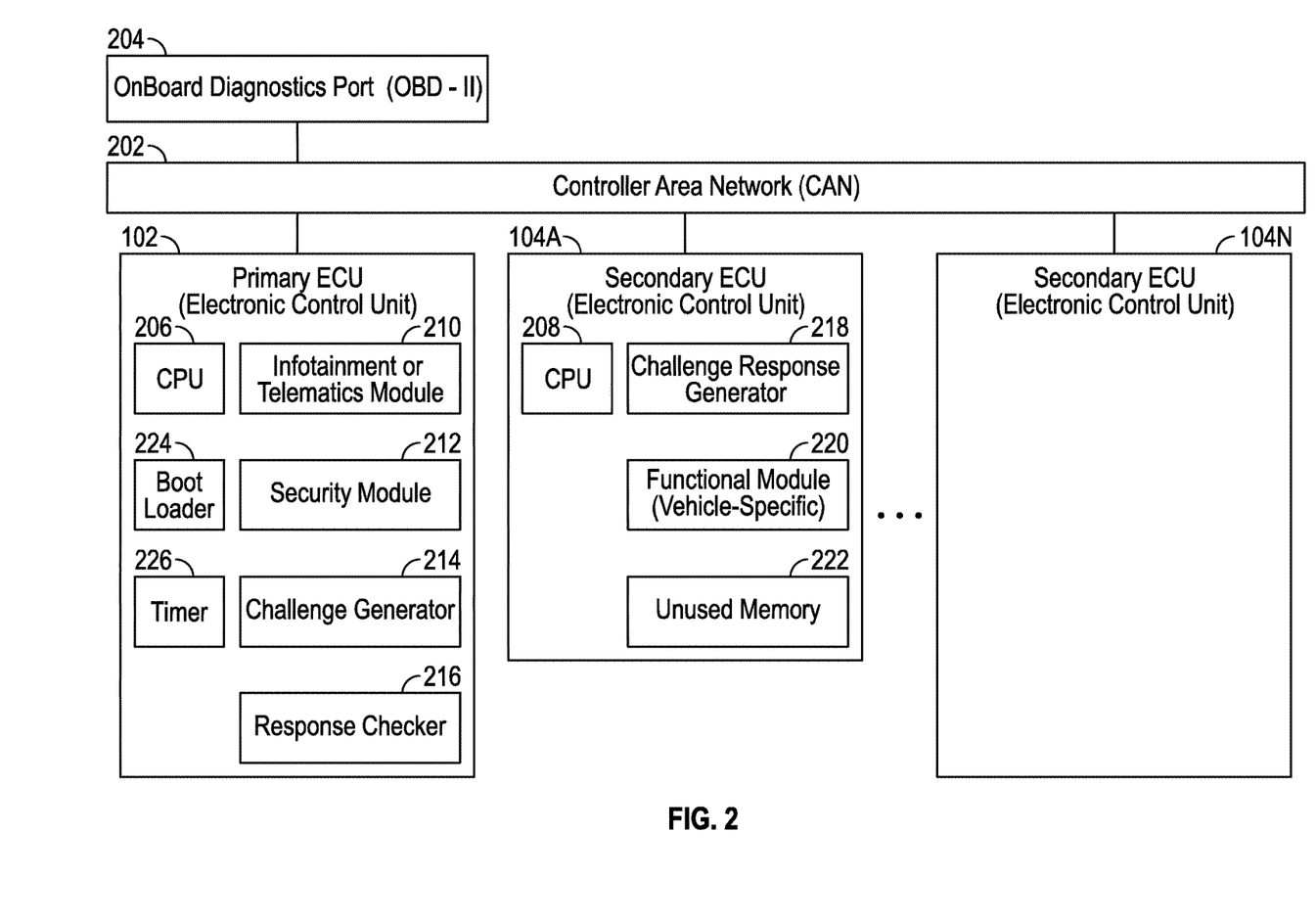
FIG. 2 is a system diagram showing internal details of the electronic control units, and further details of the vehicular system of FIG. 1 in accordance with some embodiments.

FIG. 2 is a system diagram showing internal details of the electronic control units 102, 104A, . . . 104N, and further details of the vehicular system of FIG. 1. A Controller Area Network 202 (also known as a CAN or CAN bus) couples the electronic control units 102, 104A, . . . 104N, supporting communication among the electronic control units. In some embodiments, an onboard diagnostics port 204, for example a port conforming to the second-generation OBD-II standard, is coupled to the controller area network 202. The onboard diagnostics port 204 is employed, e.g., by a technician at an automobile repair shop or dealership for diagnostics of the vehicular system, and may be employed to update or upgrade components (e.g., to "flash" updated programming into an electronic control unit). Some embodiments are accompanied by external verification of the primary electronic control unit 102 and/or the secondary electronic control units 104A, . . . 104N. This verification could be performed via the onboard diagnostics port 204, or other access point, using various methods. An attacker may also employ the onboard diagnostics port 204, an access point through the primary electronic control unit 102, one or more of the secondary electronic control units 104A, . . . 104N, or other access point in order to program malware into an electronic control unit.

In the embodiment shown in FIG. 2, the primary electronic control unit 102 has a CPU 206, an infotainment or telematics module 210, a security module 212, a challenge generator 214, and the response checker 216. The primary electronic control unit 102 may have other components as well, for example components related to specific functions performed by, and features of, the electronic control unit 102. Such components could include modules for a display screen, a touchscreen, various control inputs, a global positioning system (GPS) unit, navigation systems, audio systems, and so on. Some of these may be part of the infotainment or telematics module 210. The CPU 206 may participate in the processing for various modules, or one or more modules may have a CPU dedicated to that module, and one or more modules may be reprogrammable (e.g., with flash memory, a replaceable read-only memory or ROM, or an erasable programmable read-only memory or EPROM).

The security module 212 forms the foundation for a secure boot system. Some or all of the security module 212 resides in hardware, mask programmed read-only memory (ROM), one-time programmable (OTP) memory, or one-time programmable firmware, in some embodiments. The primary electronic control unit 102 self-verifies, to establish the chain of trust. In this embodiment, the security module 212 performs a self-check of itself and of a boot loader 224. The boot loader 224 is responsible for booting up the primary electronic control unit 102, including booting up the CPU 206. Duties of the boot loader 224 could include initializing I/O, initializing various parameters, initializing data memory, configuring various peripheral devices and/or other tasks related to the initial state of the primary electronic control unit 102. The self-check should be performed in response to power up and/or system reset. As an example of the self-check, some embodiments include a public key and a verification script stored in one time programmable memory, one-time programmable firmware or hardware, or on a system on chip (On-SoC). The use of one time programmable electronics allows the public key and the verification script to be programmed in initially, but an attacker cannot reprogram these, since one time programmable circuitry is not erasable and reprogrammable. The security module 212 executes the verification script, for example on a dedicated security co-processor, or a processor which is part of the security module 212, or on the CPU 206, as a further example. The verification script verifies the security module 212, the boot loader 224, and selected portions or the entirety of the remainder of the primary electronic control unit 102. In some versions, a public key (as discussed above) is applied during the verification. For example, the security module 212 could execute the verification script, which performs a keyed hash function calculation on portions or all of a program memory of the primary electronic control unit 102, producing a hash function result. This hash function result is then compared to a previously calculated or predetermined and stored value. The stored value may be stored in the security module 212 or elsewhere in the primary electronic controller unit 102 in some embodiments. If the two values are equal, the self-verification is complete and the primary electronic control unit 102 is self-verified. Some embodiments of the security module 212 have and apply the Trustzone security extension as described above. Further embodiments employ various further mechanisms and methods for self-verification as readily devised in accordance with the teachings herein.

The secure boot system and process adds cryptographic checks to each stage of a secure world boot process, which aims to assert the integrity of all of the secure world software images that are executed, preventing any unauthorized or maliciously modified software from running. Once the primary electronic control unit 102 is self-verified, via the security module 212, the secure boot and process extends the chain of trust to each of the secondary electronic control units 104A, . . . 104N. It does so by having the challenge generator 214 issue security challenges to the secondary electronic control units 104A, . . . 104N, and having the response checker 216 verify security responses from the secondary electronic control units 104A, . . . 104N.

The security response indicates an aspect of contents of memory of the secondary electronic control unit 104A, . . . 104N, which is verified or validated by the response checker 216 of the primary electronic control unit 102. Information stored in the primary electronic control unit 102, for use in verifying the security responses, is individualized and pertains to the contents of the memory of each of the secondary electronic control units 104A, . . . 104N. In some embodiments, this information is part of the response checker 216, and some or all of the response checker resides in reprogrammable memory or reprogrammable firmware. With such embodiments, the response checker 216, and more particularly the information used by the response checker 216 to verify the security responses, is updatable (reprogrammable) in the event of an update or an upgrade to one or more of the secondary electronic control units 104A, . . . 104N.

In the embodiment shown in FIG. 2, the secondary electronic control unit 104A has a CPU 208, a challenge response generator 218, a functional module 220, and unused memory 222. The CPU 208 could be similar to the CPU 206 of the primary electronic control unit 102, or could differ from that. Generally, the CPU 208 of the secondary electronic control unit 104A is less powerful than the CPU 206 of the primary electronic control unit 102, but this is not a requirement. The functional module 220 is vehicle-specific, and could include functions for heating, ventilation and air-conditioning (HVAC or climate control), engine control, transmission control, antilock brakes, lighting, electric windows, electric doors, seat adjustment, or mirror adjustment, and so on. While the secondary electronic control unit 104A is shown as having unused memory 222, it should be appreciated that the challenge response generator 218 and the functional module 220 may each have memory which is used, e.g., for program storage and/or data storage. It is also possible that a secondary electronic control unit 104 could use all of the memory and not have unused memory 222. The challenge response generator 218, which could be a software module, firmware module or hardware module, generates a response according to the challenge received from the primary electronic control unit 102.

With ongoing reference to FIGS. 1 and 2, multiple scenarios and mechanisms are applicable to various embodiments of the vehicular system. To verify the booting state of the secondary electronic control units 104A, . . . 104N, the system employs software-based remote attestation and uses an already-verified device, i.e., the primary electronic control unit 102, as the trusted tester. In particular, the trusted tester generates a challenge, which in some embodiments is a randomized challenge, and sends the challenge to the to-be-tested electronic control unit 104A, . . . 104N, over the controller area network 202. The secondary electronic control unit 104A, . . . 104N computes or otherwise generates a response to the received challenge, based on the computational state of the secondary electronic control unit 104A, . . . 104N. One mechanism includes checking if the to-be-verified program (e.g. in the secondary electronic control unit 104A) has the correct memory layout, including both location and content. Examples of this type of remote attestation designs include designs that provide the guarantee of "verifiable code execution" on a computing system to an external verifier. That is, the verifier obtains an assurance that the execution of an arbitrary piece of code on a computing system cannot be tampered with by any malware that may be present on the computing system. In some embodiments, the primary electronic control unit 102 verifies some or all of the memory of the secondary electronic unit 104A as to location and content.

Another mechanism for checking is to stuff the unused memory 222 of a secondary electronic control unit 104A with previously determined data (e.g., a repeated bit sequence, number or character). This leaves no extra space in which malware could reside. The challenge could request a calculation be performed on data from the supposedly unused memory 222, with results of the calculation sent back as the response. A calculation result value differing from an expected result could indicate corruption, e.g., by malware. Another mechanism for checking is to expect that the response is sent back before a time threshold. Malicious code in a compromised electronic control unit 104A might cause the response to have a different time delay, e.g., might slow the response time of the electronic control unit 104A. This could be detected by having the primary electronic control unit 102 start a timer 226, or note a time value on an already running timer 226, when the challenge is sent from the primary electronic control unit 102 to the secondary electronic control unit 104A. Upon receipt of the response from the secondary electronic control unit 104A, the primary electronic control unit 102 could stop the timer 226 or note the time value, and deduce a response time for the secondary electronic control unit 104A in responding to the challenge. This response time could then be compared to a time threshold. The time threshold could be established by simulating, testing, or characterizing the system. If the response time is longer than the time threshold, or in some embodiments shorter than the time threshold, or outside of a time threshold range, this could indicate a compromised secondary electronic control unit 104A. Some embodiments have a timeout feature so that the system does not hang. Yet another mechanism for checking is to have the secondary electronic control unit 104A read a portion of memory and perform a calculation or an operation thereupon. The calculation could be performed upon program data starting at a fixed address, or a randomized address specified in the challenge, or upon the entirety of the program memory, in various embodiments.

The challenge could indicate, or be interpreted by the secondary electronic control unit 104A as, a request for a result of a cyclic redundancy check (CRC) calculation, a hash calculation, an exclusive or (XOR) calculation, a keyed hash calculation, or a statistical calculation or sampling (e.g., a spot check), over a portion or all of the program memory of the secondary electronic control unit 104A in some embodiments. The secondary electronic control unit 104A would then perform the calculation or sampling and send back the result of this calculation or sampling. The primary electronic control unit 102 could compare this result to a previously stored (i.e., predetermined) value in memory in the primary electronic control unit 102.

The challenge could indicate, or be interpreted by the secondary electronic control unit 104A as, a request for a result of an image compression of, or a copy of, some or all of the program memory of the secondary electronic control unit 104A in some embodiments. The secondary electronic control unit 104A would then send back the result of this image compression or copy. The primary electronic control unit 102 could compare the result to a previously stored compressed image or uncompressed copy of the program memory of the secondary electronic control unit 104A, which is stored in memory in the primary electronic control unit 102.

The challenge could include one or more randomized addresses, along with an explicit or interpretable request as above. The secondary electronic control unit 104A would then access its memory at the randomized address or addresses, perform a calculation, a sampling, an image compression, or a copy relative to the randomized address or addresses, and return results in the response. The primary electronic control unit 102 could then compare these results to an appropriate and corresponding previously stored data set in the memory in the primary electronic control unit 102.

In various embodiments, according to the above scenarios, the response checker 216 on the primary electronic control unit 102 could include or be coupled to various types of information to be applied when verifying the response from a secondary electronic control unit 104A. This information could include a copy or a compressed image of some or all of the memory of the secondary electronic control unit 104A (and of other electronic control units 104N), statistical information, cyclic redundancy check values, exclusive or calculation values, hash calculation values, keyed hash calculation values or other calculation results. These calculation results could be performed prior to or during initial system installation, or system upgrade, and stored in memory on the primary electronic control unit 102. Alternatively, these calculations could be performed on a copy of program memory of each of the secondary electronic control units 104A, . . . 104N, with these copies stored on the electronic control unit 102. Calculations could be performed on compressed images stored on the electronic control unit 102, with or without decompression as appropriate to the type of calculation.

Goals for verifying the primary electronic control unit 104 or the secondary electronic control units 104A, . . . 104N could include verifying that firmware is not modified, verifying the program code is unmodified, and/or verifying that a software stack of multiple layers of software is unmodified. The types and contents of the challenges and responses, and also of the self-check, can be tailored to accomplish some or all of these goals. For example, security checking of the software stack could proceed up one layer at a time. A more detailed check could provide byte for byte or word for word comparisons, while a less detailed check could involve a calculation over a section of memory or the entire contents of memory. Multiple types of checks can be combined in some embodiments.

In some embodiments, an upgrade or update is allowed on one or more of the secondary electronic control units 104A, . . . 104N. This could include replacing or reprogramming an electronic control unit 104A, . . . 104N. The update could occur via the onboard diagnostics port 204, or, in some embodiments, the update could be an over-the-air update via a wireless port, e.g., Bluetooth or satellite radio. In embodiments allowing upgrade or update, the information stored on the electronic control unit 102 should also be updated, so that verification of challenge responses can be accurately performed on upgraded or updated electronic control units 104A, . . . 104N. Some embodiments perform this updating automatically, e.g., by the primary electronic control unit 102 monitoring the updating or upgrading of a secondary electronic control unit 104A and copying, compressing, or performing calculations based on, the updated program code of the secondary electronic control unit 104A. Other embodiments have this updating performed by an external agent, e.g., an external device communicating through the onboard diagnostics port 204 or other access point. It should be appreciated that such external updating should be accompanied by appropriate security measures, e.g., encryption, authentication, etc., in order to decrease risk of an attacker defeating the above-described secure boot mechanisms. It should be further appreciated that the techniques and mechanisms disclosed herein can further be applied to diagnostics for some types of failure, such as dropped bits, corrupted memory, accidental erasure, or power loss to a memory component, to name a few.

Figure 3:
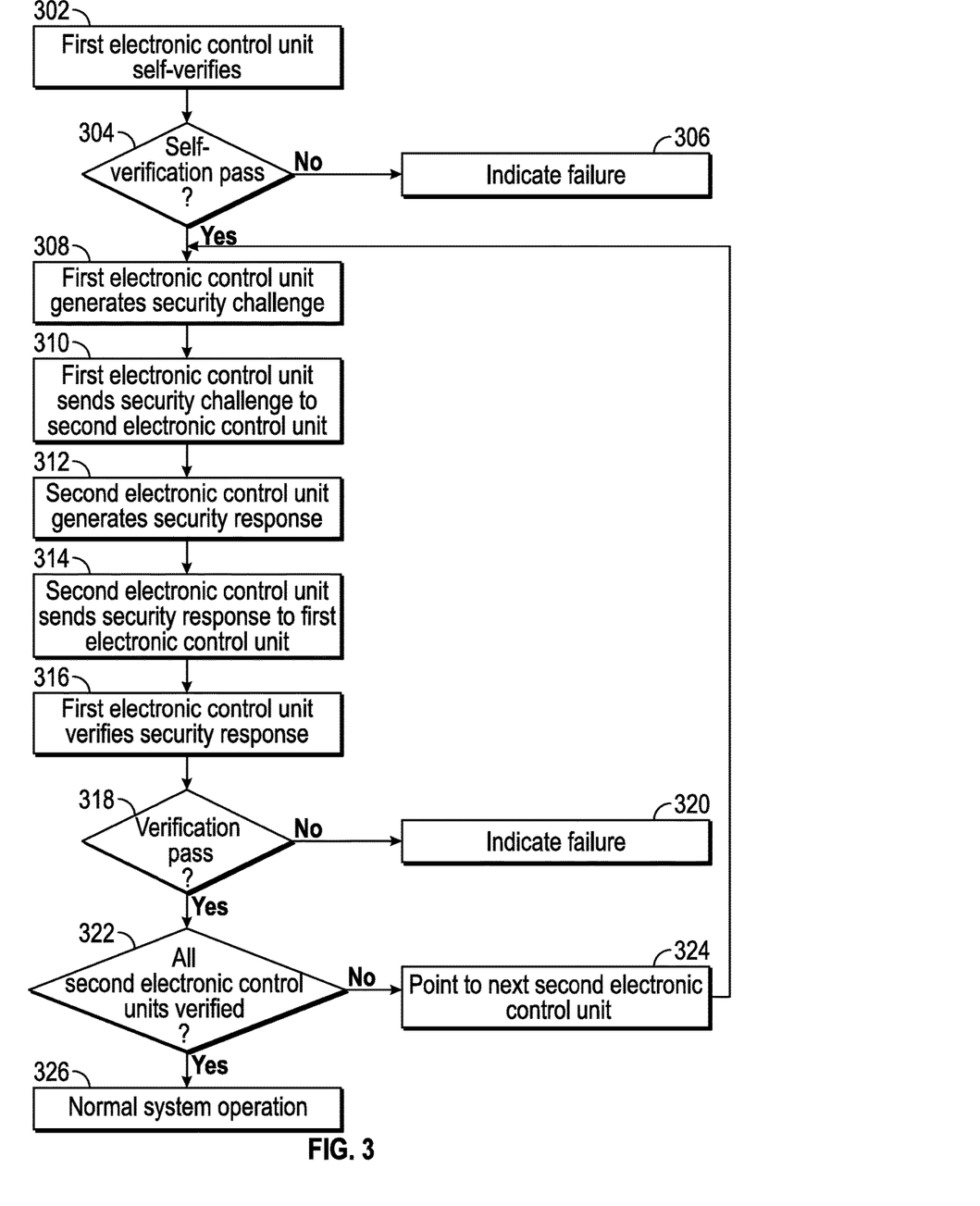
FIG. 3 is a flow diagram of a method for a secure boot of a vehicular system, which can be practiced on or by embodiments shown in FIGS. 1 and 2 in accordance with some embodiments.

FIG. 3 is a flow diagram of a method for a secure boot of a vehicular system, which can be practiced on or by embodiments shown in FIGS. 1 and 2. More specifically, the method can be practiced by the processors of the electronic control units in embodiments of the vehicular system described above. Electronic control units in the vehicular system are categorized as first or second electronic control units. The first electronic control unit has the capability to self-verify. Second electronic control units are not required to have self-verify capability equal to that of the first electronic control unit, but should be able to respond to a security challenge by issuing a security response. Communication among electronic control units occurs along a vehicular network or bus.

The first electronic control unit self-verifies, in an action 302 of FIG. 3. For example, a processor of the first electronic control unit, or a dedicated security processor or co-processor, could execute a verification script and authenticate the boot loader. This mechanism could apply a key, in some embodiments, for example in a keyed hash function applied to the contents of a memory that holds the boot loader. In a decision action 304, it is determined whether the self-verification passes. If the self-verification does not pass, flow branches to the action 306, to indicate failure. Failure could be indicated by activating a display such as an indicator lamp or an on-screen message, e.g., in a telematics or infotainment unit, or some other audible or visual indicator. Failure could be indicated by branching to a diagnostic process or a failsafe process. If the self-verification does pass, flow branches to the action 308.

Still referring to FIG. 3, the first electronic control unit generates a security challenge, in action 308. In some embodiments, this is randomized. The security challenge could request that the second electronic control unit fetch data from some randomized address, or send back a result of a calculation performed on some or all of the memory of the second electronic control unit, for example. The first electronic control unit sends the security challenge to the second electronic control unit, in an action 310. For example, in the vehicular system, the security challenge could be sent via the controller area network. In some embodiments, a timer is started or a time value noted, in order to measure the response time of the second electronic control unit with regard to responding to the security challenge.

The second electronic control unit generates a security response, in action 312. This depends on, and is in response to, the security challenge. For example, if the security challenge specifies an address, the second electronic control unit could interpret this as a request for data from that address in the memory of the second electronic control unit, or a calculation on data starting at that address in the memory. Alternatively, the security challenge could be a code word or phrase, and the second electronic control unit could interpret this via a lookup table, etc. The second electronic control unit could perform a calculation on all of the data in the memory, or a subset of the data, or on an address range as indicated by the security challenge. The second electronic control unit sends the security response to the first electronic control unit, in action 314. For example, the security response could be sent via the controller area network. Upon receiving the security response, in some embodiments, the first electronic control unit stops the timer or otherwise acquires a measurement of the response time of the second electronic unit.

The first electronic control unit verifies the security response, in action 316 of FIG. 3. This could include stopping or checking a timer upon receipt of the security response, and comparing the response time to a time threshold, with a too-long response time indicating a compromised system. Verifying the security response could include comparing data in the security response to previously stored data in the first electronic control unit, such as data generated during development, initial installation, or upgrade of the system. If the security response fails to verify, this could indicate a compromised system. In a decision action 318, it is determined whether the verification by the first electronic control unit of the security response from the second electronic control unit passes. If the verification of the security response does not pass, flow branches to the action 320, to indicate failure. Failure could be indicated through any of the mechanisms indicated above. In some embodiments, failure could be indicated by branching to a diagnostic process or a failsafe process. If the self-verification does pass, flow branches to the decision action 322.

In the decision action 322, it is determined whether all second electronic control units are verified. If not all second electronic control units are verified, flow branches to the action 324, to point to the next second electronic control unit. Once the system is ready, i.e., pointing to the next second electronic control unit, flow returns back to the action 308, so that the first electronic control unit can generate a security challenge for the next second electronic control unit and perform the verification as discussed above. If all of the second electronic control units are verified, flow proceeds to the action 326. In the action 326, normal system operation commences or otherwise takes place, as the system has completed or is soon to complete a secure boot. At such time, the first electronic control unit has self-verified, and the first electronic control unit has verified all of the security responses, i.e., has verified all of the second electronic control units. With the chain of trust established and including the first electronic control unit and all second electronic control units, the system can perform normal operation in confidence that the electronic control units have not been compromised.

Figure 4:
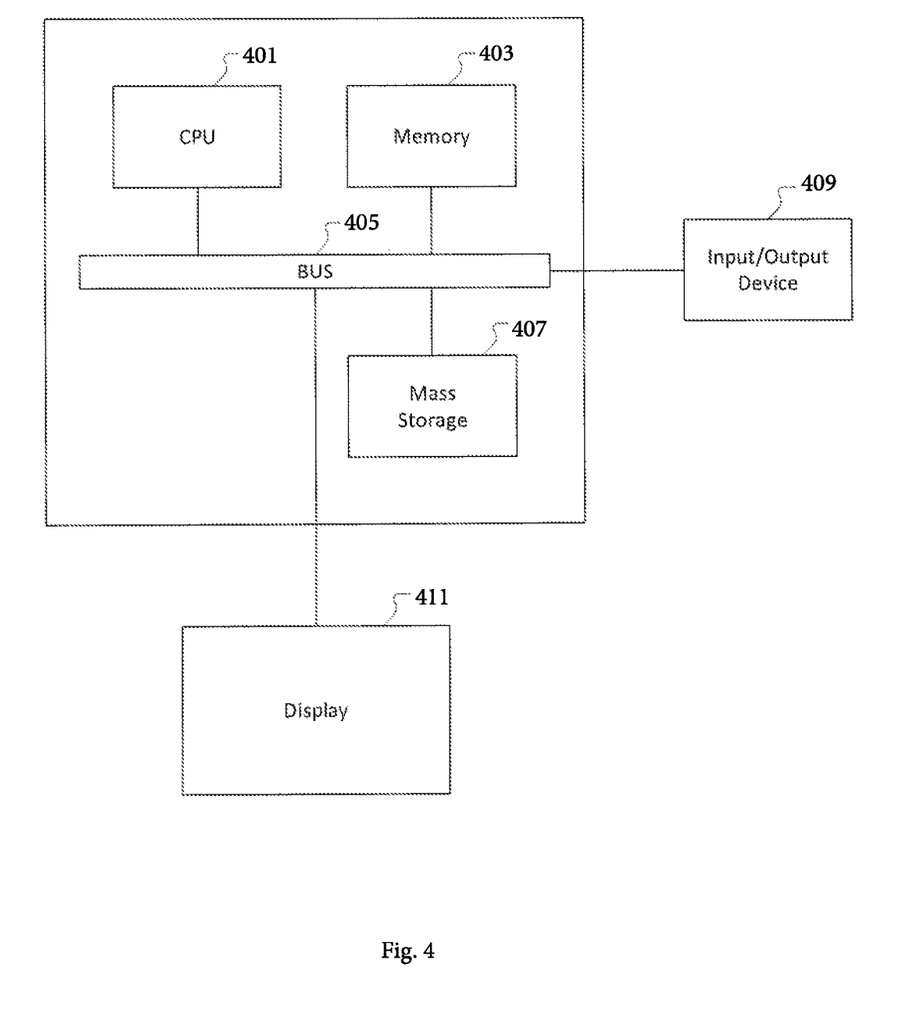
FIG. 4 is an illustration showing a computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for self-verification and/or verification of other electronic control units in accordance with some embodiments. The computing device includes a central processing unit (CPU) 401, which is coupled through a bus 405 to a memory 403, and mass storage device 407. Mass storage device 407 represents a persistent data storage device such as a floppy disc drive or a fixed disc drive, which may be local or remote in some embodiments. The mass storage device 407 could implement a backup storage, in some embodiments. Memory 403 may include read only memory, random access memory, etc. Applications resident on the computing device may be stored on or accessed via a computer readable medium such as memory 403 or mass storage device 407 in some embodiments. Applications may also be in the form of modulated electronic signals modulated accessed via a network modem or other network interface of the computing device. It should be appreciated that CPU 401 may be embodied in a general-purpose processor, a special purpose processor, or a specially programmed logic device in some embodiments.

Display 411 is in communication with CPU 401, memory 403, and mass storage device 407, through bus 405. Display 411 is configured to display any visualization tools or reports associated with the system described herein. Input/output device 409 is coupled to bus 405 in order to communicate information in command selections to CPU 401. It should be appreciated that data to and from external devices may be communicated through the input/output device 409. CPU 401 can be defined to execute the functionality described herein to enable the functionality described with reference to FIGS. 1-3. The code embodying this functionality may be stored within memory 403 or mass storage device 407 for execution by a processor such as CPU 401 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. While the embodiments are applied to a vehicle system this is not meant to be limiting. In addition, while the vehicle system may be a land, sea, or air based system, the embodiments may be extended to non-vehicle systems also.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to"

perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for a secure boot of a system, comprising:
a primary electronic control unit (ECU) of the system performing, in response to a boot of the system, a security self-verification on the primary ECU to verify the primary ECU by a security module of the primary ECU locally executing a verification script permanently stored locally in read-only memory (ROM) of the primary ECU such that the verification script cannot be remotely updated;
the primary ECU sending, after the performing of the security self-verification, a security challenge to a secondary ECU of the system; and
the primary ECU verifying a security response received from the secondary ECU in response to the security challenge, the security response relating to the security challenge and indicating an aspect of contents of memory of the secondary ECU,
wherein the performing of the security self-verification and the verifying of the security response establishes a chain of trust between the primary ECU and the secondary ECU.

2. The method of claim 1, wherein the performing of the security self-verification includes applying a public key and the verification script to authenticate a boot loader of the primary ECU.

3. The method of claim 1, further comprising:
the primary ECU randomizing the security challenge prior to the sending.

4. The method of claim 1, wherein the verifying of the security response includes comparing a time threshold to a response time of the secondary ECU in replying with the security response.

5. The method of claim 1, wherein the verifying of the security response includes one of: a spot check, a cyclic redundancy check (CRC), a hash calculation, an exclusive or (XOR) calculation, data compression, or a copy, of at least a portion of the memory of the secondary ECU.

6. The method of claim 1, further comprising:
the primary ECU updating information to be applied in verifying the security response, responsive to an update or an upgrade to the secondary ECU.

7. A tangible, non-transitory, computer-readable media having instructions thereupon which, when executed by a processor, cause the processor to perform a method comprising:
a primary electronic control unit (ECU) of a vehicular system performing, in response to a boot of the vehicular system, a security self-check on the primary ECU to verify the primary ECU by a security module of the primary ECU locally executing a verification script permanently stored locally in read-only memory (ROM) of the primary ECU such that the verification script cannot be remotely updated;
the primary ECU generating a security challenge;
the primary ECU transmitting, after the performing of the security self-check, the security challenge to a secondary ECU of the vehicular system through a network or bus of the vehicular system;
the primary ECU receiving a security response from the secondary ECU in reply to the security challenge, the security response relating to contents of memory of the secondary ECU; and
the primary ECU verifying the security response to validate at least a portion of the content of the memory of the secondary ECU and to establish a chain of trust between the primary ECU and the secondary ECU.

8. The computer-readable media of claim 7, wherein:
the security challenge includes a randomized address; and
the security response relates to data at the randomized address in the memory of the secondary ECU.

9. The computer-readable media of claim 7, wherein the performing of the security self-check includes verifying a boot loader of the primary ECU, using a public key and the verification script, with the public key and the verification script stored on the primary ECU in the ROM, which comprises one or more of: one time programmable (OTP) memory and one time programmable firmware.

10. The computer-readable media of claim 7, wherein the verifying of the security response includes:
the primary ECU timing a response time from when the security challenge is transmitted until the security response is received; and
the primary ECU comparing the response time to a time threshold.

11. The computer-readable media of claim 7, wherein:
unused memory of the secondary ECU has memory stuffed with predetermined data; and
the verifying of the security response includes verifying that the unused memory of the secondary ECU has the memory stuffed with the predetermined data.

12. The computer-readable media of claim 7, wherein:
the verifying of the security response includes comparing contents of the security response to a predetermined result stored on the primary ECU; and
the predetermined result includes a result of a previously performed one of: a spot check, a cyclic redundancy check (CRC), an exclusive or (XOR) calculation, compressed data, or a copy, of at least a portion of the contents of the memory of the secondary ECU.

13. A vehicular system with secure boot, comprising:
a vehicular network or bus;
a secondary electronic control unit (ECU) coupled to the vehicular network or bus;

a primary ECU, coupled to the vehicular network or bus, and comprising a processor, memory, read-only memory (ROM), a security module, a challenge generator and a response checker;

the security module configured to perform, in response to a boot of the vehicular system, a self-check of the primary ECU by the security module locally executing a verification script permanently stored locally in the ROM of the primary ECU such that the verification script cannot be remotely updated;

the challenge generator configured to generate a security challenge and to send, after the performing of the self-check, the security challenge to the secondary ECU via the vehicular network or bus; and the response checker configured to receive a security response from the secondary ECU in reply to the security challenge and configured to check the security response to validate at least a portion of contents of memory of the secondary ECU and to establish a chain of trust between the primary ECU and the secondary ECU.

14. The vehicular system of claim 13, wherein:
the secondary ECU is configured to receive the security challenge and to generate the security response; and
the security response includes information regarding the at least the portion of the contents of the memory of the secondary ECU.

15. The vehicular system of claim 13, wherein:
the vehicular system further comprises a diagnostics port coupled to the vehicular network or bus;
the challenge generator is configured to send security challenges to a plurality of secondary ECUs; and
the response checker is configured to receive and check security responses from the plurality of secondary ECUs, wherein the response checker includes individualized information regarding the at least the portion of the contents of the memory of each of the plurality of secondary ECUs to extend the chain of trust to the plurality of secondary ECUs.

16. The vehicular system of claim 13, wherein the response checker comprises or is coupled to one of:

a copy of the at least the portion of the contents of the memory of the secondary ECU;

a compressed image of the at least the portion of the contents of the memory of the secondary ECU;

statistical information regarding the at least the portion of the contents of the memory of the secondary ECU;

a result of a cyclic redundancy check (CRC) of the at least the portion of the contents of the memory of the secondary ECU; or a result of an exclusive or (XOR) calculation performed on the at least the portion of the contents of the memory of the secondary ECU.

17. The vehicular system of claim 13, wherein:
the response checker is configured to apply, in checking the security response, stored information regarding the at least the portion of the contents of the memory of the secondary ECU, wherein the stored information is in the primary ECU; and
the primary ECU is configured to update the stored information, responsive to an update or an upgrade to the secondary ECU.

18. The vehicular system of claim 13, wherein:
at least a portion of the security module resides in the ROM, which comprises one or more of mask programmed read-only memory (ROM), one time programmable (OTP) memory, and one time programmable firmware; and
the response checker resides at least partially in one of: reprogrammable memory, or reprogrammable firmware.

19. The vehicular system of claim 13, wherein:
the primary ECU further comprises a timer configured to measure a response time between the primary ECU sending the security challenge and the primary ECU receiving the security response; and
the response checker checking the security response comprises determining whether the response time is within a time threshold.

* * * * *